United States Patent [19]

Hicks, Jr.

[11] Patent Number: 4,749,396
[45] Date of Patent: Jun. 7, 1988

[54] METHOD OF FORMING AN OPTICAL FIBER PREFORM

[75] Inventor: John W. Hicks, Jr., Northboro, Mass.

[73] Assignee: Polaroid Corporation, Cambridge, Mass.

[21] Appl. No.: 695,063

[22] Filed: Jan. 25, 1985

[51] Int. Cl.$^4$ .................... C03C 25/02; C03B 19/09
[52] U.S. Cl. ........................................ 65/3.12; 65/3.2; 65/18.1
[58] Field of Search ................. 65/3.12, 3.2, 13, 18.1, 65/18.4, 144

[56] References Cited

U.S. PATENT DOCUMENTS

| | | | |
|---|---|---|---|
| 3,146,082 | 8/1964 | Hicks, Jr. et al. | 65/3 |
| 3,659,915 | 5/1972 | Maurer et al. | 350/96 |
| 3,877,912 | 4/1975 | Shiraishi et al. | 65/13 |
| 3,932,162 | 1/1976 | Blankenship | 65/13 |
| 4,123,483 | 10/1978 | Nakahara et al. | 264/1 |
| 4,264,347 | 4/1981 | Shintani et al. | 65/13 |
| 4,295,869 | 10/1981 | Shirashi et al. | 65/3.12 |
| 4,326,869 | 4/1982 | Kurosaki et al. | 65/3.14 |
| 4,410,345 | 10/1983 | Usui et al. | 65/3.15 |
| 4,465,708 | 8/1984 | Fanucci et al. | 65/3.12 |
| 4,505,729 | 3/1985 | Matsumura et al. | 65/3.12 |
| 4,518,407 | 5/1985 | Black et al. | 65/3.12 |

OTHER PUBLICATIONS

W. D. Kingery et al., *Intro. to Ceramics*, 1976 Edition, pp. 94–101.
MacChesney et al., "Low Loss Silica Core-Borosilicate Clad Fiber Optical Waveguide" Applied Phys. Letter, pp. 340–341, 9/15/73.

Primary Examiner—S. Leon Bashore
Assistant Examiner—Michael K. Boyer
Attorney, Agent, or Firm—Francis J. Caufield

[57] ABSTRACT

An improved method of forming an optical fiber preform includes separately forming a rod-like inner member and a hollow tube-like outer member by a soot glass deposition technique. The inner member is inserted into the outer member, while they are both in their unconsolidated state, and the asssembled parts heated to cause the outer member to collapse about the inner member and form a preform. The resulting preform can be drawn in one or more stages to provide an optical fiber having sharp step change in its index of refraction between the core and the cladding, a superior quality core to cladding interface, and improved optical transmission qualities. The inner and outer members can, if desired, be partially consolidated but for an unconsolidated layer at their interface prior to heating the outer member to cause it to join with the inner member. In accordance with one feature of the present invention, an unconsolidated layer can be left on the outside surface of the outer member to provide a resulting fiber having superior mechanical handling characteristics.

7 Claims, 1 Drawing Sheet

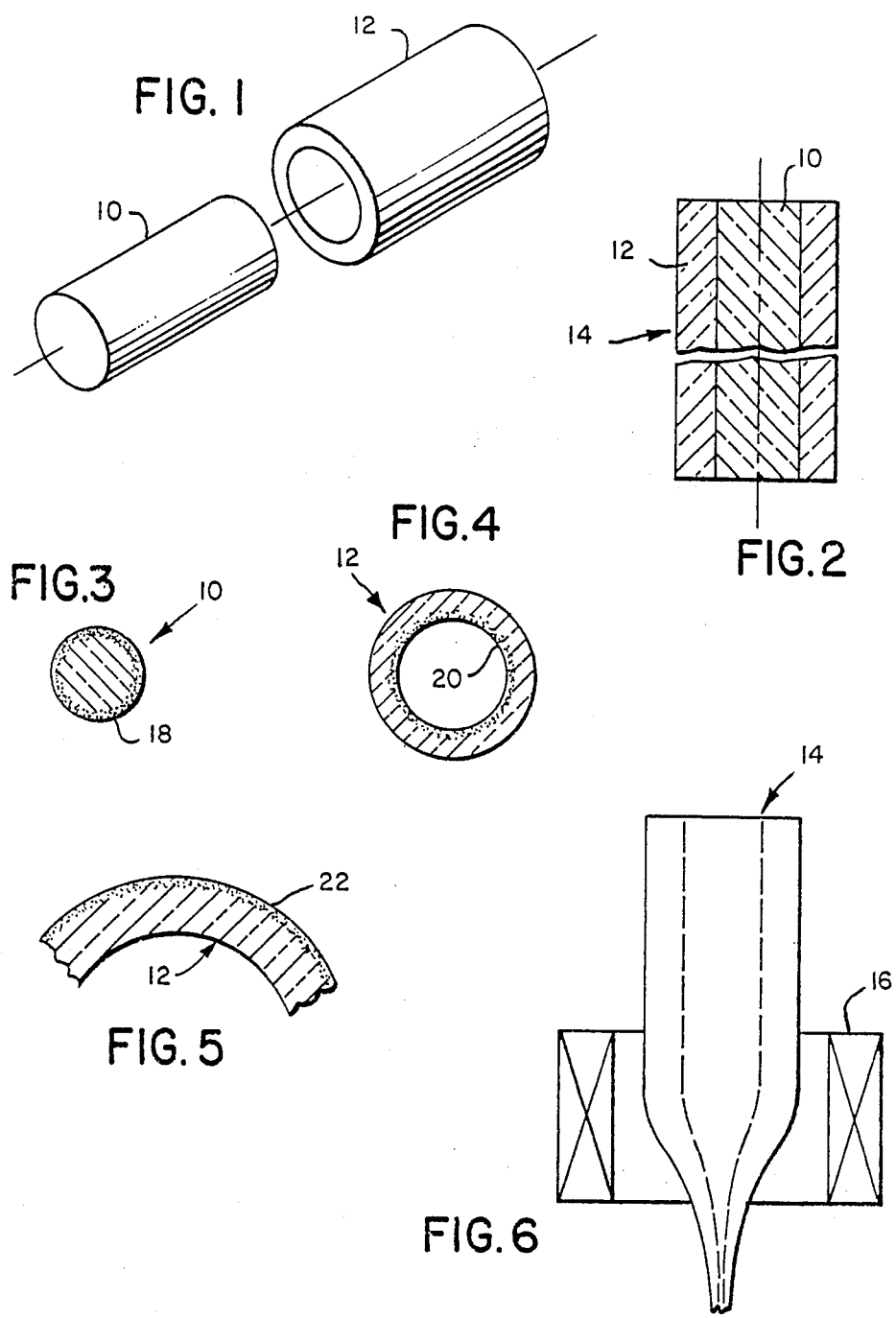

METHOD OF FORMING AN OPTICAL FIBER PREFORM

BACKGROUND OF THE INVENTION

This invention relates to optical waveguide forming methods. More particularly, it concerns an improved method for forming preforms from which optical fibers having improved transmission characteristics may be drawn.

Optical fiber waveguides have found widespread application in data transmission systems because of their small size and high rate data transmission capabilities as compared to previously utilized systems. The optical fibers, which are manufactured from a glass-like silica material and have a finished diameter as low as 5-10 microns, typically include a light transmitting inner zone or core and an outer cladding layer that surrounds the core. The cladding typically has an index of refraction less than that of the core and functions to confine most of the propagated light to the core, although as much as 30% of the light in the smaller, single-mode optical fibers can be transmitted in the cladding immediately adjacent to the core. While the core and cladding oftentimes have respective circular cross-sections, the core can also have non-circular configurations and can include longitudinal channels as well as webs and similar structures.

Various processes have been developed for manufacturing optical fibers, but most utilize a preform from which the optical fiber is drawn. A preform typically has a diameter (e.g. 25 mm) several orders of magnitude larger than that of the finished fiber and a cross sectional configuration that is the same, although on a much larger scale, as that of the finished fiber. In drawing the fiber, one end of the preform is inserted into a furnace and heated to a sufficiently high temperature to heat-soften the material which can then be drawn into a fiber.

A variety of processes have been developed for manufacturing preforms. In one process, an inner member and an outer member are separately formed from a high-purity silica. In the simplest preform organization, the inner member can take the form of a solid cylindrical rod and the outer member can take the form of a hollow tube. The inner member is inserted into the outer member and the two members heated until the outer member collapses about and joins with the inner member to define a preform from which an optical fiber can be drawn.

Optical fibers produced from inner and outer starting members have the advantage of a relatively sharp step change in the index of refraction at the core to cladding interface since the characteristics and physical dimensions of the separately formed starting members can be accurately controlled prior to their assembly and joining. Also, the use of separately formed components permits the convenient manufacture of preforms having non-circular cross-sections, including preforms in which the inner members include open channels and supporting webs. Forming preforms using separate inner and outer members has generally not been successful for low loss transmission fibers due to defects such as caused by particulate or air inclusions at the interface between the two parts. The presence of inclusions or other defects at the interface results in optical fibers having diminished optical transmission characteristics, particularly in the smaller diameter single-mode fibers where as much as 30% of the energy is propagated in the cladding.

In other processes for fabricating preforms, such as in the chemical vapor deposition (CVD) process, a starting member, such as a hollow tube, is coated, either on its interior or exterior surfaces, with high purity particulate silica reaction products. The particulate silica can be doped to increase or decrease its index of refraction, as appropriate, to define a coated tube which is consolidated and collapsed to define the preform. In contrast to the aforementioned technique using separate starting components, the various CVD techniques are not well-suited to the formation of preforms having relatively sharp changes in the index of refraction, particularly in those CVD processes where multiple layers are applied, or to the formation of preforms having non-circular configurations, channels, or web-like structures. Problems associated with foreign particle and air inclusions are minimized, however, since the CVD techniques usually apply particulate silica directly onto a supporting surface under carefully controlled conditions.

As also can be appreciated, a need exists for a method of fabricating preform that, like the procedure which utilizes separate components, allows for the convenient control of the optical and physical characteristics of the separate components that eventually form the core and cladding of the finished fiber and which provides for a sharp step change in the index of refraction between the core and cladding of the finished fiber, and, like the various CVD techniques, provides a "clean" interface between the core and cladding of the resulting fiber.

SUMMARY OF THE INVENTION

In view of the above, the present invention provides an improved method for manufacturing optical preforms from which optical fibers having improved optical transmission qualities can be produced. An inner member and an outer member are fabricated separately by a glass vapor deposition technique with the physical and optical characteristics of each controlled to provide an inner member having a higher index of refraction than the outer member. The two components, in their unconsolidated state, are assembled with the inner member positioned within the outer member. The assembly is then heated to cause the inner and outer members to join with one another and define a preform. The preform can then be heated and drawn in one or more drawing stages to form the final optical fiber. Since the two starting members are formed separately, their physical and optical characteristics can be precisely controlled and a relatively sharp step change in the index of refraction between the two components can be maintained. Additionally, a high quality interface can be obtained since the use of unconsolidated components allows for the formation of a clean inclusion-free interface. If desired, the inner member can be partially consolidated but for an unconsolidated outer surface or the outer member can be partially consolidated but for an unconsolidated inner surface prior to their assembly and heating. In accordance with one feature of the invention, an unconsolidated layer can be left on the outer surface of the outer member to provide superior mechanical handling characteristics.

A principal objective of the present invention is, therefore, the provision of an improved method of manufacturing an optical fiber preform by utilizing fully or partially unconsolidated inner and outer members in which the resulting fiber has a superior quality core to cladding interface and optical transmission qualities. Other objects and further scope of applicability of the present invention will become apparent from the detailed description to follow, taken in conjunction with the accompanying drawings, in which like parts are designated by like reference characters.

BRIEF DESCRIPTION OF THE DRAWING

FIG. 1 is an isometric view of an unconsolidated silica inner member positioned for insertion into a hollow unconsolidated silica outer member;

FIG. 2 is a side elevational view, in cross section, of the assembled inner and outer members of FIG. 1;

FIG. 3 is an end view of the inner member of FIG. 1 illustrating an unconsolidated outer layer;

FIG. 4 is an end view of the outer member of FIG. 2 illustrating an unconsolidated inner layer;

FIG. 5 is an end view of a circumferential portion of the outer member of FIG. 1 illustrating an unconsolidated outer layer; and FIG. 6 is a side elevational view of a preform, fabricated in accordance with the present invention, being drawn into an optical fiber.

DESCRIPTION OF THE PREFERRED EMBODIMENT

In accordance with the present invention, an optical preform is fabricated, as illustrated in FIG. 1, by first forming an inner member 10 and a hollow outer member 12 from a high purity silica material by vapor deposition such as the chemical vapor deposition (CVD) technique as described in detail below. In the preferred embodiment disclosed herein, the inner member 10 has been presented as a solid cylindrical rod while the outer member 12 has been presented as a hollow tube. As can be appreciated, the inner and outer members, 10 and 12, can take various forms, including non-circular cross-sections, and forms also having longitudinal channels and webs. In addition, the outer member need not be a single closed body as in the case of the disclosed embodiment, but can take the form of an open channeled member or a multi-part outer member. The formed inner member 10 is positioned within the outer member 12 to form an assembly which is then heated to cause the outer member 12 to collapse about and join with the inner member 10 to define, as shown in FIG. 2, a preform 14 in which the inner member 10 is completely surrounded by the outer member 12. As is known in the art, the material from which the inner member 10 is fabricated is provided with a higher relative index of refraction than that of the outer member 12 so that the resulting optical fiber, as described below, will have a core and a cladding with the core having a relatively higher index of refraction than the cladding. In the alternative, the outer member 12 can be fabricated to have a lower index of refraction relative to that of the inner member 10.

In forming the inner and outer members, 10 and 12, by the chemical vapor deposition technique, silicon tetrachloride vapor is mixed with oxygen and heated to a temperature in the region of 1400° C.–1800° C. at which temperature oxidation occurs via the reaction:

$$SiCl_4 + O_2 > SiO_2 + 2Cl_2$$

As a consequence of the reaction, fine silica particles are formed and deposited on a suitable substrate. The accumulation of unconsolidated silica particles can then be used to form a solid cylindrical inner member 10 or a hollow outer member 12. Where desired, the index of refraction of the inner member 10 can be increased by the addition of dopants, such a phosphorus or germanium, to the material that forms the inner member 10, these dopants assisting in the formation of higher index of refraction phosphosilicate or germanosilicate glass. Additionally, the index of refraction of the resulting cladding can be decreased by the addition of dopants, such as boron or fluorine, to the material that forms the outer member 12 to reduce the index of refraction.

The CVD process is such that the deposited material may not have the desired final dimensions, dimensional tolerances, or overall configuration. In forming the inner and outer members, 10 and 12, the members can be shaped by conventional shaping or machining techniques known in the art to their final shape with a small clearance fit that allows convenient assembly.

After formation of the unconsolidated inner and outer members, 10 and 12, and any shaping or machining as described above, the inner member 10 is inserted into the outer member 12 to define an assembly which is then heated to cause the outer member 12 to collapse about and join the inner member 10 to define the preform 14, as shown in FIG. 2. As the outer member 12 collapses about the inner member 10, the presence of unconsolidated material at the interface between the two members allows for the dissapation of any entrapped air or gas since the unconsolidated material, being constituted by discrete particles, is sufficiently porous to prevent the formation of undesirable inclusions. This aspect of the present invention is particularly important with regard to the manufacture of single-mode optical fibers where as much as 30% of the electromagnetic energy is propagated in the cladding. In addition, the use of two separate starting components allows for a relatively sharp step in the index of refraction between the core and cladding of the resulting fiber. After the inner and outer components are joined to form the preform 14 of FIG. 2, an optical fiber may be formed in the usual manner by inserting one end of the preform 14 into a furnace 16, as schematically illustrated in FIG. 6, to heat the preform. After the preform 14 is heated, a bait rod or other implement can be used to draw the material, in one or more steps, into an optical fiber which retains the cross sectional organization of the starting preform.

In the process described above, both the inner and outer members, 10 and 12, are in an unconsolidated, porous state to define an unconsolidated interface therebetween. As can be appreciated, the inner member 10 and the outer member 12 can be each partially consolidated while still defining an unconsolidated interface between the two. For example, a consolidated rod can be formed by one of many known techniques and a CVD layer applied to its exterior surface to provide an outer unconsolidated layer as indicated by the stippled peripheral zone 18 in the end view of the exemplary rod-like inner member 10 of FIG. 3. In the alternative, an unconsolidated inner member 10 can be formed by the CVD technique described above and subjected to preferential zone heating to consolidate the interior while leaving an unconsolidated outer layer. In an analogous manner, an exemplary tube-like outer member can be consolidated by preferentially heating a circumferential outer layer to leave an inner unconsolidated layer as indicated by the stippled interior zone 20 in the end view of the inner member 12 of FIG. 4. The partially consolidated inner and outer members, 10 and 12, are then assembled so that an unconsolidated layer is interposed between the two. The assembled members 10 and 12 can then be heated to cause them to join to form a unitary preform 14 having the desirable characteristics described above. Thereafter and as shown in FIG. 6, the one end of the preform 14 can be inserted in a furnace 16 to heat the preform 14 to its drawing temperature to allow fiber drawing as mentioned above.

In the process described above, both the inner and outer members, 10 and 12, were partially consolidated to define mutual unconsolidated surfaces. As can be appreciated, it is not necessary that both components be provided with an unconsolidated layer, one component or the other having an unconsolidated layer will yield the desired higher quality core to cladding interface in the resulting fiber and the improved optical transmission characteristics.

In accordance with one feature of the present invention, the outer surface of the outer member 12 may be left unconsolidated to provide a fiber having superior handling qualities. An exemplary unconsolidated layer of the outer member 12 is illustrated by the stippled region or zone 22 in FIG. 5.

Thus it will be appreciated from the above that as a result of the present invention, a highly effective method of forming an optical preform is provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims.

What is claimed is:

1. A method of forming an optical fiber preform comprising the steps of:

forming a silica inner member and a silica outer member by a glass vapor deposition technique which requires consolidation following the deposit to form a glass of low loss optical waveguide quality, at least an outer portion of said inner member or an inner portion of said outer member remaining in an unconsolidated state, and the inner member having a higher relative index of refraction than that of at least an inner portion of the outer member;

positioning the inner member within the outer member to define an assembly; and heating the assembly with unconsolidated portions still in an unconsolidated state to cause the outer member to fuse to the inner member to form a consolidated preform.

2. The method of claim 1 wherein the forming step includes forming the inner member with a consolidated inner zone and an unconsolidated outer layer.

3. The method of claim 1 wherein the forming step includes forming the outer member with a consolidated outer zone and an unconsolidated inner layer.

4. The method of claim 1 wherein the forming step includes forming the inner member with a consolidated inner zone and an unconsolidated outer layer and the outer member with a consolidated outer zone and an unconsolidated inner layer.

5. The method of claim 1 wherein the forming step includes forming the outer member with an unconsolidated outer layer.

6. The method of claim 1 wherein said glass deposition technique is chemical vapor deposition.

7. A method of forming an optical fiber preform, the method comprising the steps of forming a glass inner member having at least an outer surface portion of given index of refraction by a glass deposition technique which requires consolidation following the deposit to form a fused glass of low loss opitical waveguide quality, forming a glass outer member having at least an inner surface portion of an index of refraction different from said given index by a glass deposition technique which requires consolidation following the deposit to form a fused glass of low loss optical waveguide quality, at least one of said surface portions being retained in its unconsolidated state following said forming steps, positioning the inner member within the outer member to define an assembly, and heating the assembly with its at least one unconsolidated portion yet remaining in its unconsolidated state to cause the members to fuse together to form a consolidated preform.

* * * * *